US008477912B2

(12) United States Patent
Cai et al.

(10) Patent No.: US 8,477,912 B2
(45) Date of Patent: Jul. 2, 2013

(54) CONTENT SHARING THROUGH MULTIMEDIA RINGBACK TONES (75) Inventors: Yigang Cai, Naperville, IL (US); Shiyan Hua, Lisle, IL (US)

(73) Assignee: Alcatel Lucent, Paris (FR)

( * ) Notice: Subject to any disclaimer, the term of this patent is extended or adjusted under 35 U.S.C. 154(b) by 1155 days.

(21) Appl. No.: 11/374,246

(22) Filed: Mar. 13, 2006

(65) Prior Publication Data
US 2007/0211872 A1    Sep. 13, 2007

(51) Int. Cl.
*H04M 1/64* (2006.01)
(52) U.S. Cl.
USPC .................. 379/67.1; 379/207.16
(58) Field of Classification Search
USPC .......... 379/372, 377, 142.01, 207.16, 373.01, 379/373.02, 373.03, 114.13, 207.08; 455/412.2, 455/414.1, 418–420, 567
See application file for complete search history.

(56) References Cited

U.S. PATENT DOCUMENTS

| 6,603,844 | B1 * | 8/2003 | Chavez et al. ........... 379/114.13 |
| 7,512,421 | B2 * | 3/2009 | Kim et al. ..................... 455/567 |
| 2004/0174983 | A1 * | 9/2004 | Olschwang et al. .......... 379/377 |
| 2004/0184595 | A1 * | 9/2004 | Urata et al. ................... 379/350 |
| 2005/0105706 | A1 * | 5/2005 | Kokkinen ................ 379/201.01 |
| 2006/0109969 | A1 * | 5/2006 | Oh ........................... 379/207.16 |
| 2006/0182247 | A1 * | 8/2006 | Batni et al. .................... 379/189 |
| 2006/0206604 | A1 * | 9/2006 | O'Neil et al. ................. 709/223 |
| 2006/0291639 | A1 * | 12/2006 | Radziewicz et al. ..... 379/211.01 |
| 2008/0311895 | A1 | 12/2008 | Feng et al. |

FOREIGN PATENT DOCUMENTS

| EP | 1720268 A1 | 8/2006 |
| JP | 11289528 A | 10/1999 |
| JP | 2002-055679 A | 2/2002 |
| JP | 2003-162285 A | 6/2003 |
| JP | 2005184816 A | 7/2005 |
| WO | WO 2004/054282 | 6/2004 |
| WO | WO 2004/084566 | 9/2004 |
| WO | WO 2005/043926 | 5/2005 |

* cited by examiner

*Primary Examiner* — Amal Zenati
(74) *Attorney, Agent, or Firm* — Duft Bornsen & Fettig LLP (57) ABSTRACT

Communication networks and associated methods are disclosed that provide a content sharing service through multimedia ringback tones. The communication network comprises a network node and a multimedia ringback system. The network node receives a call from a calling party to a subscriber of the content sharing service, and routes the call to the multimedia ringback system. The multimedia ringback system identifies a multimedia ringback tone for the call where the multimedia ringback tone includes a message prompting the calling party to share content of the subscriber, and provides the multimedia ringback tone to the calling party. The multimedia ringback system then receives a request for the content indicated in the multimedia ringback tone from the calling party, and initiates the transfer of the content to the calling party responsive to the request.

18 Claims, 5 Drawing Sheets

CONTENT SHARING THROUGH MULTIMEDIA RINGBACK TONES

BACKGROUND OF THE INVENTION

1. Field of the Invention

The invention is related to the field of communication networks and, in particular, to providing for content sharing in communication networks through multimedia ringback tones.

2. Statement of the Problem

When a calling party places a call to a called party, the ring tone or audio sounds heard by the calling party when waiting for the called party to answer the call are referred to as ringback tones. The communication network over which the call is placed provides the ringback tones to the calling party, which is typically a ringing sound. A present trend of service providers is to offer customized ringback tones to its subscribers. Customized ringback tones may comprise music, songs, sound clips, audio messages, prerecorded greetings, etc, that the communication network plays as ringback tones instead of or in addition to the traditional ringing sound. Customized ringback tones may be associated with specific directory numbers of the calling parties, such as with phone lists or exclusion lists. The subscriber can also set conditions for when, for whom, or what is played for the ringback tones based on time, day of the week, the calling party, etc. Customized ringback tones have generated high revenues for services providers.

Emerging multimedia phones (e.g., wireless handsets, broadband wireline phone sets, SIP phones, etc) allow for multimedia ringback tones. A multimedia ringback tone comprises any multimedia-type message, such as text, audio, video, etc, that is played while a calling party waits for a called party to answer a call. The subscriber can define selected images or video clips as multimedia ringback tones and store them in the communication network. If a calling party calls the subscriber, the communication network plays back the selected image or video clip, possibly along with audio, to the calling party based on the multimedia ringback tone profile defined by the subscriber. Although multimedia ringback services are useful, they may have further features that have not been explored by service providers.

Apart from multimedia ringback services, some individuals create or own content that they want to share with other people, such as friends and family. Content sharing such as this is especially popular for younger individuals that want to share digital pictures, images, video clips, etc, with their friends. To share content on the Internet, an individual may email the content to another party, may post the content on their website for download by another party, or share the content in other ways. Unfortunately, there may be content sharing mechanisms that have not been explored by service providers.

SUMMARY OF THE SOLUTION

The invention provides advantages over prior communication networks and methods by providing for a content sharing service using multimedia ringback tones. A subscriber to the content sharing service may make particular content available for sharing. If a calling party calls the subscriber, then the content sharing service takes advantage of the time period between placing the call and when the subscriber answers the call to provide an opportunity for the calling party to share the content of the subscriber. If the calling party identifies that he/she would like to download the content, then the communication network facilitates the download of the content to the communication device of the calling party. The communication network described herein advantageously provides a new mechanism to allow for content sharing between parties. The communication network described herein also advantageously generates additional revenue for the service provider that may charge the subscriber for the content sharing service, and may charge the calling party for the content download.

One embodiment of the invention comprises a communication network that provides a content sharing service through multimedia ringback tones. The communication network comprises a network node and a multimedia ringback system which together provide the content sharing service. The network node is adapted to receive a call from a calling party to a subscriber of the content sharing service, and route the call to the multimedia ringback system. The multimedia ringback system is adapted to identify a multimedia ringback tone for the call where the multimedia ringback tone includes a message prompting the calling party to share content of the subscriber, and provide the multimedia ringback tone to the calling party while the calling party waits for the call to be answered by the subscriber. The multimedia ringback system is further adapted to receive a request for the content indicated in the multimedia ringback tone from the calling party, and initiate the transfer of the content to the calling party responsive to the request. The calling party may then advantageously share the content offered by the subscriber.

Another embodiment comprises a method of operating the communication network described above.

Another embodiment comprises a method of operating a communication device of a calling party to provide the content sharing service. One step of the method comprises receiving a multimedia ringback tone for the call from a communication network that includes a message prompting the calling party to share content of the subscriber. Another step comprises providing the multimedia ringback tone including the prompting message to the calling party while the calling party waits for the call to be answered by the subscriber. Another step includes receiving a selection to download the content from the calling party. Another step includes transmitting a request for the content to the communication network responsive to receiving the selection from the calling party.

The invention may include other exemplary embodiments described below.

DESCRIPTION OF THE DRAWINGS

The same reference number represents the same element on all drawings.

DETAILED DESCRIPTION OF THE INVENTION

FIGS. 1-5 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
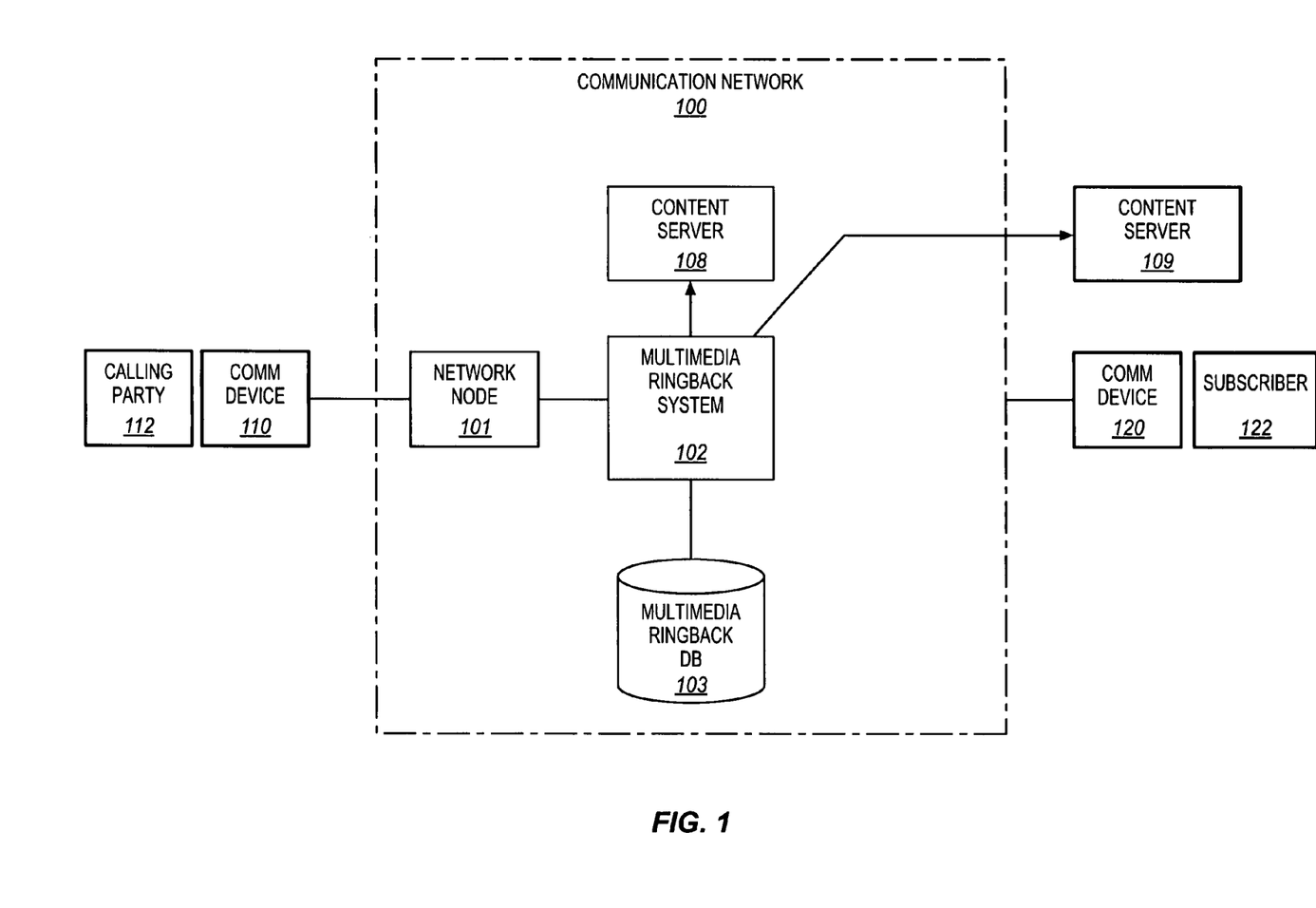
FIG. 1 illustrates a communication network in an exemplary embodiment of the invention.

FIG. 1 illustrates an exemplary communication network 100 in an exemplary embodiment of the invention. Communication network 100 may comprise a wireline network, an IP Multimedia Subsystem (IMS) network, or a wireless network such as a CDMA network, a TDMA network, a GSM network, or a UMTS network. Communication network 100 is adapted to provide a content sharing service as is further described below. Communication network 100 is further adapted to provide communications between calling party 112 through communication device 110 and a subscriber 122 of the content sharing service through communication device 120. Communication devices 110 and 120 comprise any communication devices, such as a wireline phone, a wireless (mobile) phone, a PDA, a PC, a VoIP phone, a SIP-based phone, etc. Communication network 100 may include other networks, systems, or devices not shown in FIG. 1.

Communication network 100 includes a network node 101, a multimedia ringback system 102, and a multimedia ringback database 103. Communication network 100 is also illustrated as including a content server 108 or communicating with a content server 109 remote from communication network 100. Network node 101 includes any switch, server, or other device that serves communication device 110 for a call. For instance, network node 101 may comprise a switch in a wireline network or a Mobile Switching Center (MSC) in a wireless network. Multimedia ringback system 102 comprises any system that handles multimedia ringback tones for communication network 100. Communication network 100 allows for customized multimedia ringback tones, where the customized multimedia ringback tones may be predefined by subscriber 122 or other entities associated with subscriber 122. Multimedia ringback system 102 handles the customized multimedia ringback tones, such as by providing a mechanism to allow subscriber 122 to predefine the multimedia ringback tones, by storing and maintaining the customized multimedia ringback tones in multimedia ringback database 103 or other databases, etc. Multimedia ringback system 102 may comprise a single, independent server or system in communication network 100, such as an Intelligent Peripheral (IP) or an Application Server (AS), or may be distributed among multiple servers or systems in communication network 100. Multimedia ringback system 102 may also be incorporated in network node 101.

Multimedia ringback database 103 comprises any database configured to store information on multimedia ringback tones. The information on the multimedia ringback tones may include actual content for multimedia ringback tones, such as audio files, video files, etc. The information on the multimedia ringback tones may also or alternatively include property information, such as a title of a multimedia ringback tone, an owner of a multimedia ringback tone, a location of a multimedia ringback tone (e.g., a link, a network address, etc), applicable directory numbers for the multimedia ringback tone, etc. Multimedia ringback database 103 does not necessarily store each of the actual multimedia ringback tones, but should include information on the multimedia ringback tones to be used in communication network 100. Multimedia ringback database 103 is accessible by multimedia ringback system 102. Multimedia ringback database 103 may be integrated with multimedia ringback system 102, or may be distributed among multiple servers or systems in communication network 100 or on other servers or systems in other networks (not shown).

Content servers 108-109 comprise any systems or servers configured to store content. Content is generally understood by those skilled in the art to be files or data, such as music, songs, sound clips, animated images, video clips, movies, digital pictures, etc. Content may be uploaded to content server 108 or 109 by subscriber 122, by the service provider operating communication network 100, or by another party. Content server 108 is illustrated as being local to or included in communication network 100, and content server 109 is illustrated as being remote from communication network 100. With content server 109 being remote from communication network 100, multimedia ringback system 102 may communicate with content server 109 through an IP network (not shown) or another type of transport network.

Communication network 100 is adapted to provide a content sharing service to subscriber 122 and other subscribers through multimedia ringback tones. For the content sharing service, subscriber 122 may set up or predefine some information for communication network 100. For one, subscriber 122 identifies content that subscriber 122 wants to share with calling parties. Subscriber 122 may identify the content by file name, by network address, etc. Subscriber 122 also makes the content available to communication network 100. To make the content available, subscriber 122 may identify a location of the content if the content is located on the subscriber's communication device 120, on the subscriber's PC, or on some other server of the subscriber 122. Subscriber 122 may also make the content available by uploading the content to a content server 108 or 109 that is used by communication network 100 specifically for the content sharing service.

Subscriber 122 may also generate multimedia ringback tones or specify what is to be included in the multimedia ringback tones. Subscriber 122 may generate different multimedia ringback tones for different people, such as friends and family. Subscriber 122 may record one or more multimedia ringback tones in his/her own voice. Subscriber 122 may also define music, audio clips, video clips, etc, for one or more multimedia ringback tones. According to the embodiment described below, the multimedia ringback tones include a message prompting a calling party to share content of the subscriber 122. Therefore, subscriber 122 may define what is included in the prompting message, what content is offered in the prompting message, etc.

Subscriber 122 may also define which calling parties receive which multimedia ringback tones. Subscriber 122 may define a particular multimedia ringback tone for friends, and a different multimedia ringback tone for family. Thus, subscriber 122 may generate lists or some other filter criteria used to decide which multimedia ringback tones are played to which calling parties. As part of the filter criteria, subscriber 122 may set a time of day, a day of the week, or a day of the year for content sharing through the content sharing service. Other filter criteria may be defined by subscriber 122 as desired so that desired content may be shared with desired parties at desired times.

Figure 2:
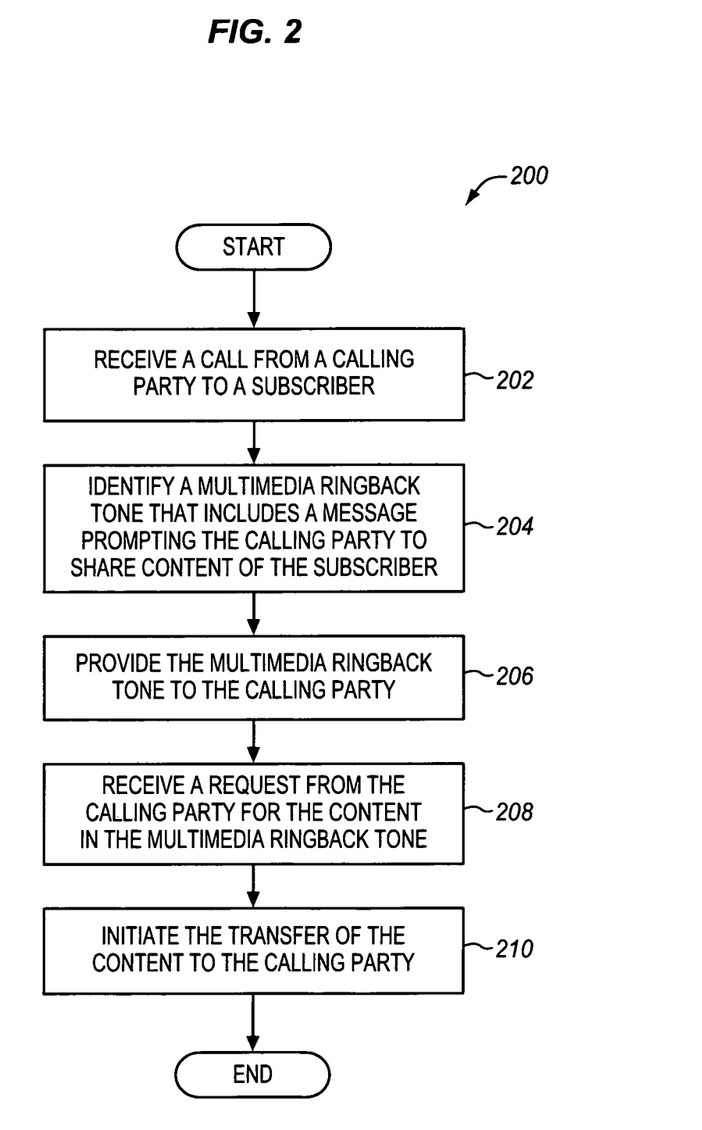
FIG. 2 is a flow chart illustrating a method of operating the communication network of FIG. 1 to provide a content sharing service through multimedia ringback tones in an exemplary embodiment of the invention.

After subscriber 122 has set up his/her service with communication network 100, assume that calling party 112 places a call to subscriber 122. FIG. 2 is a flow chart illustrating an exemplary method 200 of operating communication network 100 to provide the content sharing service through multimedia ringback tones in an exemplary embodiment of the invention. The steps of method 200 will be described with reference to communication network 100 in FIG. 1. The steps of the flow chart in FIG. 2 are not all inclusive and may include other steps not shown.

In step 202, network node 101 receives the call from calling party 112 through communication device 110 to subscriber 122. Network node 101 processes the call to determine if customized multimedia ringback tones are to be applied for this call. If so, network node 101 routes the call to multimedia ringback system 102. Network node 101 also attempts to set up the call to subscriber 122. For instance, network node 101 may route the call to a network node (not shown) that serves the communication device 120 of subscriber 122.

In step 204, multimedia ringback system 102 identifies a multimedia ringback tone for the call that includes a message prompting calling party 112 to share content of subscriber 122. Multimedia ringback system 102 may identify the multimedia ringback tone in many desired ways. For instance, multimedia ringback system 102 may receive caller identification information with the call, such as a directory number of calling party 112 and a directory number of subscriber 122, and query multimedia ringback database 103 with the directory number of calling party 112. Multimedia ringback database 103 may respond with the appropriate multimedia ringback tone corresponding with the directory number of calling party 112. The multimedia ringback tone identified for calling party 112, and the associated content being offered in the multimedia ringback tone, may depend on the identity of the calling party 112. Multimedia ringback system 102 may process the identity of calling party 122 and lists or filter criteria defined by subscriber 122. If calling party 112 is identified as a friend of subscriber 122, then multimedia ringback system 102 may identify a multimedia ringback tone offering one type of content according to the filter criteria. If calling party 112 is identified as family of subscriber 122, then multimedia ringback system 102 may identify another multimedia ringback tone offering another type of content according to the filter criteria. If calling party 112 is identified as a stranger (e.g., mass marketing call), then multimedia ringback system 102 may identify another multimedia ringback tone offering another type of content, or no multimedia ringback tone at all, according to the filter criteria.

The message prompting (also referred to as the prompting message) calling party 112 to share the content of subscriber 122 may take on many desired forms. In one example, the message may comprise an audio message prompting calling party 112 to share content. The audio message may be in the voice of subscriber 122 or in another voice stating, for example, "I have a cool digital picture you should see, press "1" to download". In another example, the message may comprise a text message prompting calling party 112 to share content. The text message may state, for example, "I have a cool audio clip you should listen to, press "1" to download". In another example, the message may comprise a video message prompting calling party 112 to share content. The video message may display, for example, "I have a cool video clip you should see, press "1" to download". The type of prompting message may depend on the capabilities of the communication device 110 of calling party 112.

Multimedia ringback system 102 may also provide the content or a portion or snippet of the content along with the prompting message. For instance, if the prompting message offers to share a digital picture with calling party 112, then multimedia ringback system 102 may include a copy of the digital picture in the multimedia ringback tone so that calling party 112 can view the picture before downloading. If the prompting message offers to share an audio clip with calling party 112, then multimedia ringback system 102 may include a copy of the audio clip or a portion of the audio clip in the multimedia ringback tone so that calling party 112 can listen to the audio clip before downloading. If the prompting message offers to share a video clip with calling party 112, then multimedia ringback system 102 may include a copy of the video clip or a portion of the video clip in the multimedia ringback tone so that calling party 112 can view the video clip before downloading.

In step 206, multimedia ringback system 102 provides the multimedia ringback tone identified in step 204, which includes the prompting message, to the communication device 110 of calling party 112. Multimedia ringback system 102 may provide the multimedia ringback tone in many desired ways. For instance, multimedia ringback system 102 may play the multimedia ringback tone to calling party 112 through communication device 110, where the multimedia ringback tone is stored in multimedia ringback system 102, multimedia ringback database 103, or another multimedia server accessible by multimedia ringback system 102. Multimedia ringback system 102 may alternatively access a multimedia server (not shown) that is storing the multimedia ringback tone, and instruct the multimedia server to play the multimedia ringback tone to calling party 112 through communication device 110. Multimedia ringback system 102 may alternatively transmit a network address (e.g., URL) to communication device 110 indicating the multimedia server that is storing the multimedia ringback tone. Communication device 110 would then automatically access the multimedia server to download the multimedia ringback tone responsive to receiving the network address.

According to features and aspects herein, as multimedia ringback system 102 is providing the multimedia ringback tone to calling party 112, network node 101 may wait for a time period (e.g., 1 minute, 2 minutes, 3 minutes, etc) before attempting to set up the call to subscriber 122. The time period may be predefined by subscriber 122, by the service provider operating communication network 100, etc. The time period delay allows calling party 112 more time to decide whether to download the content offered by subscriber 122 in the multimedia ringback tone before setting up the call to subscriber 122.

Figure 3:
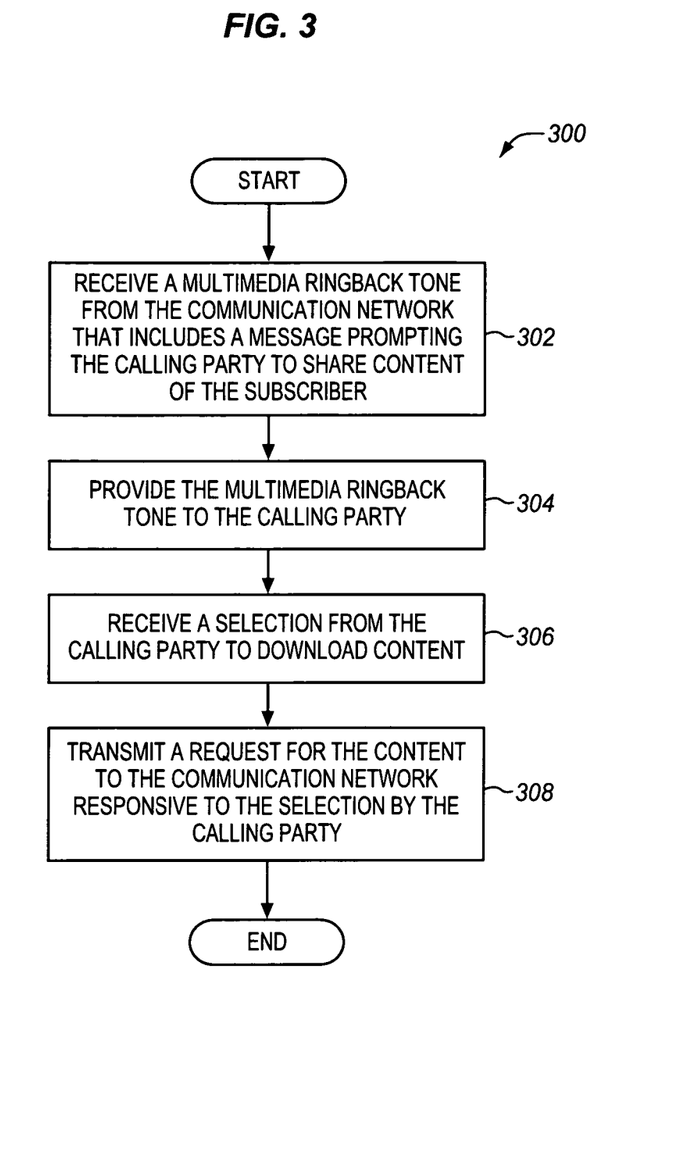
FIG. 3 is a flow chart illustrating a method of operating a communication device of a calling party in an exemplary embodiment of the invention.

FIG. 3 is a flow chart illustrating a method of operating communication device 110 in an exemplary embodiment. As previously stated, communication device 110 comprises any communication device, such as a wireline phone, a wireless (mobile) phone, a PDA, a PC, a VoIP phone, a SIP-based phone, etc. The steps of the flow chart in FIG. 3 are not all inclusive and may include other steps not shown.

Communication device 110 receives the multimedia ringback tone from multimedia ringback system 102 that includes a message prompting calling party 112 to share content of subscriber 122 in step 302. Communication device 110 then provides the multimedia ringback tone to calling party 112 in step 304 while calling party 112 waits for the call to be answered by subscriber 122. Depending on the format of the prompting message (e.g., audio message, text message, video message, etc), communication device 110 provides the prompting message to calling party 112 in the appropriate format.

If calling party 112 has an interest in sharing the content with subscriber 122, then calling party 112 may enter a value (e.g., a "1") into communication device 110, press a button on communication device 110, or somehow indicate his/her desire to download the content. Communication device 110 receives the selection from calling party 112 to download the content in step 306, and transmits a request for the content indicated in the multimedia ringback tone to communication network 100 in step 308.

In step 208 of FIG. 2, multimedia ringback system 102 receives the request for the content from calling party 112. The request may take on any desired form. In step 210, multimedia ringback system 102 initiates the transfer or download of the content to the calling party 112 responsive to the request. Multimedia ringback system 102 may initiate the transfer of the content in many desired ways. In one example, multimedia ringback system 102 may identify a content server 108 or 109 that stores the content, identify a network address for the content server 108 or 109, and transmit the network address for the content server 108 or 109 to communication device 110 of calling party 112. Responsive to receiving the network address, communication device 110 may then automatically access the proper content server 108 or 109 using the network address and download the content from the content server 108 or 109. In another example, multimedia ringback system 102 may identify a content server 108 or 109 that stores the content, retrieve the content from the content server 108 or 109, and transmit the content to communication device 110 of calling party 112.

Communication network 100 as described above advantageously provides a new mechanism for content sharing through customized multimedia ringback tones. From the perspective of subscriber 122, he/she can offer to share audio clips, video clips, digital pictures, or other content with friends and family without having to transmit the content though email or another means. From the perspective of calling party 112, he/she may be introduced to audio clips, video clips, digital pictures, or other content of subscriber 122 which he/she can share with subscriber 122.

Figure 4:
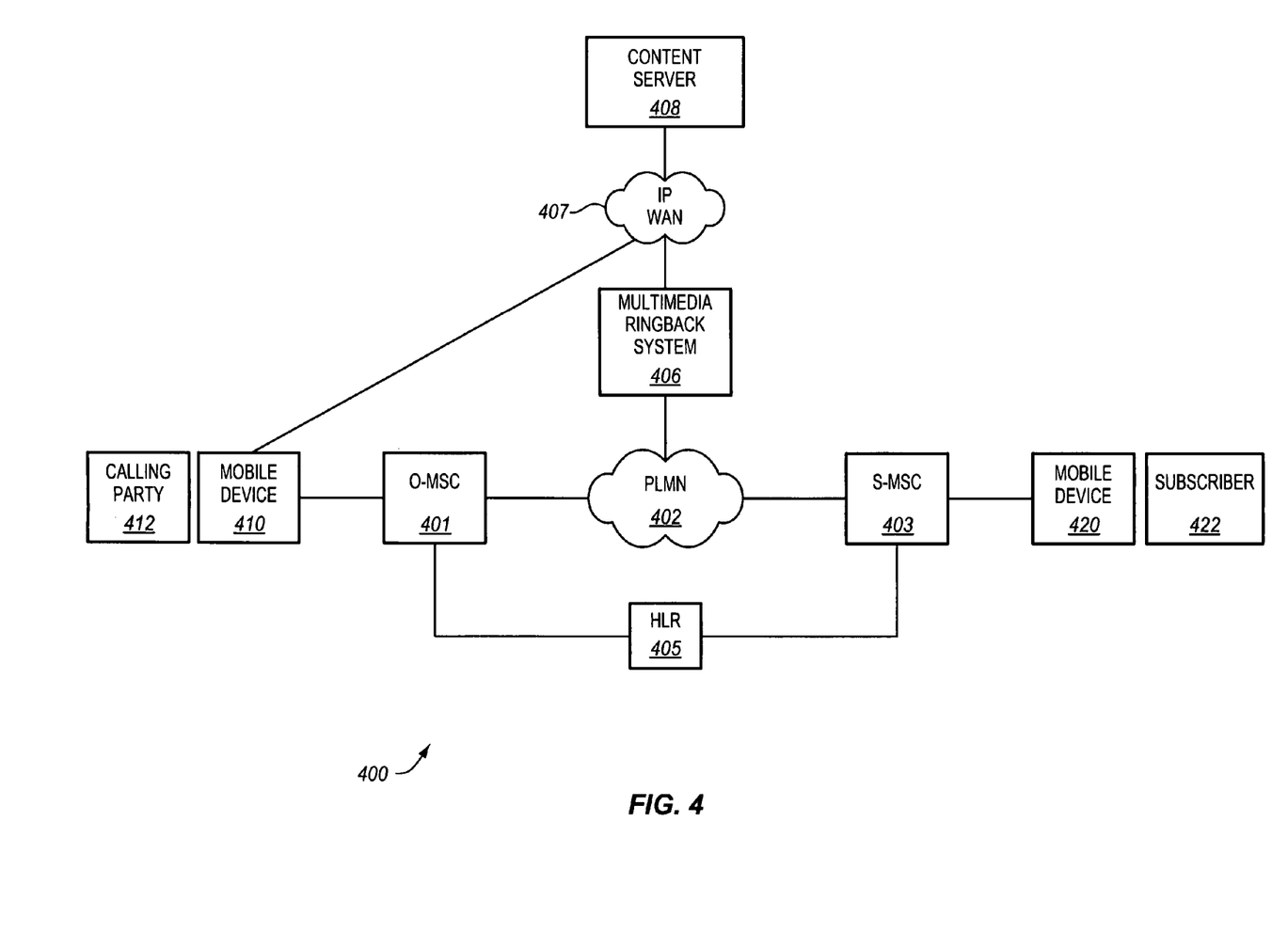
FIG. 4 illustrates another communication network in an exemplary embodiment of the invention.

FIG. 4 illustrates another communication network 400 in an exemplary embodiment of the invention. Communication network 400 comprises a wireless network in this embodiment. Communication network 400 is adapted to provide communications between calling party 412 through mobile device 410 and subscriber 422 through mobile device 420. Communication network 400 may include other networks, systems, or devices not shown in FIG. 4.

Communication network 400 includes an originating-MSC (O-MSC) 401 that serves mobile device 410 of calling party 412, and a serving-MSC (S-MSC) 403 that serves mobile device 420 of subscriber 422, each of which are connected to a Public Land Mobile Network (PLMN) 402. Communication network 400 also includes a Home Location Register (HLR) 405 that is accessible by O-MSC 401 and S-MSC 403. Communication network 400 also includes a multimedia ringback system 406 connected to PLMN 402. Multimedia ringback system 406 is also connected to an Internet Protocol (IP) WAN 407. A content server 408 is also connected to IP WAN 407. IP WAN 407 and content server 408 may be considered part of communication network 400, or may be considered as part of another network.

For the following description, assume that subscriber 422 has subscribed to a content sharing service that is provided by the service provider operating communication network 400. Also assume that subscriber 422 has uploaded content to content server 408 that subscriber 422 desires to share with calling parties.

Figure 5:
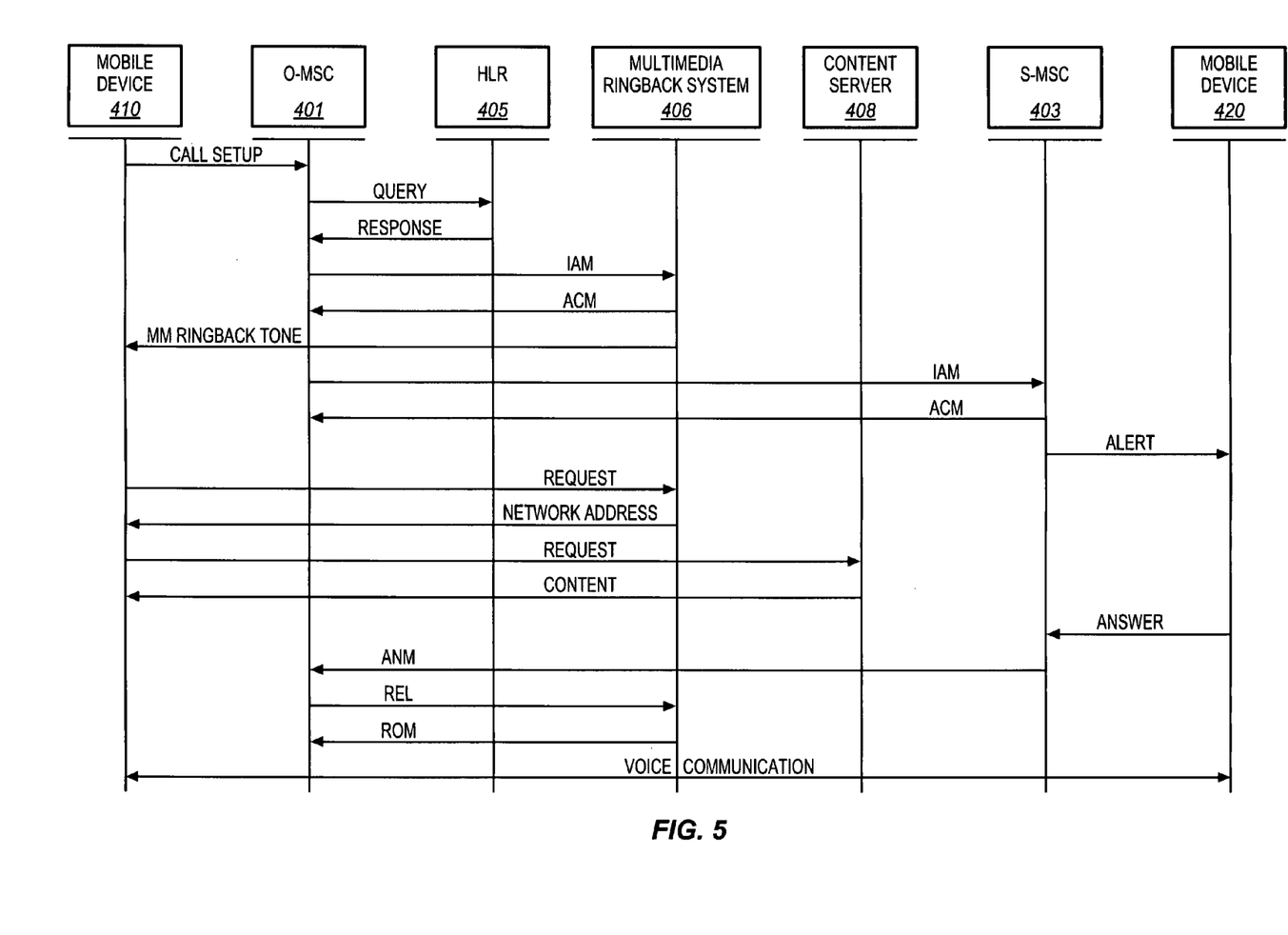
FIG. 5 is a message diagram illustrating an exemplary operation of the communication network of FIG. 4 in an exemplary embodiment.

FIG. 5 is a message diagram illustrating an exemplary operation of communication network 400 in an exemplary embodiment. To start, calling party 412 places the call to subscriber 422 by dialing the directory number for subscriber 422 on mobile device 410. Mobile device 410 transmits call setup messages or call setup signaling for the call to O-MSC 401. Responsive to the receiving call setup messages for the call, O-MSC 401 queries HLR 405 to identify call routing and service subscription information for calling party 412 and subscriber 422, and receives a response from HLR 405. In this embodiment, subscriber 422 has subscribed to the content sharing service provided by the service provider operating communication network 400. O-MSC 401 thus identifies that subscriber 422 has subscribed to the content sharing service based on the response from HLR 405, and routes the call to multimedia ringback system 406 by transmitting an Initial Address Message (IAM) to multimedia ringback system 406.

Multimedia ringback system 406 then identifies a multimedia ringback tone for the call. The multimedia ringback tones may be predefined by subscriber 422. Subscriber 422 may set up lists or other filter criteria that define which multimedia ringback tones to play for particular calling parties. The lists or filter criteria may indicate whether the multimedia ringback tone should include a message prompting the calling party to share content of the subscriber 422. Further, the lists or filter criteria may indicate which content is offered to particular calling parties. For instance, subscriber 422 may generate a white-list of calling parties that are authorized to receive a particular multimedia ringback tone offering to share particular content. Subscriber 422 may alternatively generate a black-list of calling parties that are not authorized to receive a particular multimedia ringback tone offering to share particular content. Multimedia ringback system 406 may thus identify calling party 412 (e.g., name, directory number, etc) and process the lists or filter criteria of subscriber 422 to identify the multimedia ringback tone to play for calling party 412. Multimedia ringback system 406 then transmits the identified multimedia ringback tone to calling party 412. In this embodiment, the identified multimedia ringback tone includes a message prompting calling party 412 to share content of subscriber 422. Assume for illustrative purposes that the prompting message comprises a text message stating "I have a cool audio clip you should listen to, press "1" to download".

Responsive to receiving the multimedia ringback tone, mobile device 410 provides the multimedia ringback tone, including the prompting message, to calling party 412. Calling party 412 may view the message offering to download an audio clip. The prompting message may also include the audio clip or a portion or snippet of the audio clip that calling party 412 may listen to. Calling party 412 may then decide whether or not to download the audio clip offered by subscriber 422 while waiting for subscriber 422 to answer the call.

Concurrent with the messaging described above, O-MSC 401 attempts to set up the call to subscriber 422. O-MSC 401 transmits an IAM to S-MSC 403. Responsive to receiving the IAM, S-MSC 403 transmits an Address Complete Message (ACM) to O-MSC 401. S-MSC 403 also provides alerting (e.g., ringing) through mobile device 420. In some embodiments, subscriber 422 may define a time period (e.g., 2 minutes, 3 minutes, etc) before which O-MSC 401 attempts to set up the call to subscriber 422. This allows calling party 412 more time to download the content.

If calling party 412 decides to download the content responsive to the prompting message, then calling party 412 enters a "1" into mobile device 410 as instructed in the prompting message. Those skilled in the art understand that there may be many other ways to request the download of the content. Responsive to the operation of calling party 412, mobile device 410 transmits a request from calling party 412 for the content indicated in the multimedia ringback tone.

Responsive to receiving the request from calling party 412, multimedia ringback system 406 transmits a network address for content server 408 to mobile device 410 because content server 408 is currently storing the content for subscriber 422. Mobile device 410 then automatically transmits a request for the content to the content server 408 based on the IP address provided by multimedia ringback system 406. Responsive to the request for content, content server 408 transmits the content to mobile device 410 through IP WAN 407.

In another embodiment, calling party 412 may be able to define a destination for the content download. Responsive to receiving the request from calling party 412, multimedia ringback system 406 may transmit another message to mobile device 410 prompting calling party 412 for a download destination. The download destination may be mobile device 410, an email account, or another destination. If the download destination is mobile station 410, then multimedia ringback system 406 may transmit a network address for content server 408 to mobile device 410, and mobile device 410 may request the content as described above.

If the download destination is an email account, then multimedia ringback system 406 may receive the email address of calling party 412 or retrieve the email address such as from a subscriber database. Multimedia ringback system 406 may then transmit the email address of calling party 412 to content server 408. Responsive to receiving the email address, content server 408 may then transmit the content to the email address of calling party 412.

After S-MSC 403 provides alerting to mobile device 420, assume that subscriber 422 answers the call at some point. Responsive to answering the call, S-MSC 403 transmits an Answer Message (ANM) to O-MSC 401. O-MSC 401 transmits a release message (REL) to multimedia ringback system 406. Responsive to the REL message, multimedia ringback system 406 stops transmitting the multimedia ringback tone to mobile device 410. Multimedia ringback system 406 then transmits a Release Complete Message (RCM) to O-MSC 401. O-MSC 401 also bridges the call legs for calling party 412 and subscriber 422, and voice communications are established between calling party 412 and subscriber 422.

Although specific embodiments were described herein, the scope of the invention is not limited to those specific embodiments. The scope of the invention is defined by the following claims and any equivalents thereof.

We claim:

1. A system comprising:
   a multimedia ringback system adapted to receive a call routed from a network node that serves a device of a calling party, wherein the call is placed to a subscriber of a content sharing service;
   the multimedia ringback system is further adapted to identify a multimedia ringback tone for the call that includes a message prompting the calling party to share content of the subscriber, and to provide the multimedia ringback tone to the calling party device during ringback while the calling party waits for the call to be answered by the subscriber;
   during ringback and before the subscriber answers the call, the multimedia ringback system is further adapted to receive a request from the calling party device to download the content indicated in the prompting message of the multimedia ringback tone; and
   during ringback and before the subscriber answers the call, the multimedia ringback system is further adapted to initiate the download of the content to the calling party device responsive to the request.

2. The system of claim 1 wherein the content comprises at least one digital picture.

3. The system of claim 1 wherein the content comprises a video clip.

4. The system of claim 1 wherein:
   the network node is adapted to wait for a time period before attempting to set up the call to the subscriber to allow the calling party more time to decide whether to download the content offered by the subscriber in the prompting message.

5. The system of claim 1 wherein the multimedia ringback tone further includes at least a portion of the content in addition to the message prompting the calling party.

6. The system of claim 1 wherein the multimedia ringback system is further adapted to initiate the download of the content by being adapted to:
   identify a content server that stores the content;
   identify a network address for the content server; and
   transmit the network address for the content server to the calling party device.

7. The system of claim 1 wherein the multimedia ringback system is adapted to process filter criteria defined by the subscriber to identify what to include in the prompting message of the multimedia ringback tone.

8. The system of claim 1 wherein during ringback and before the subscriber answers the call, the multimedia ringback system is further adapted to:
   transmit another message prompting the calling party for a destination for the content; and
   initiate the download of the content to the destination defined by the calling party.

9. The system of claim 8 wherein the destination comprises an email address for the calling party that is specified by the calling party during ringback.

10. A method comprising:
    receiving a call from a device of a calling party to a subscriber of a content sharing service;
    identifying a multimedia ringback tone for the call that includes a message prompting the calling party to share content of the subscriber;
    providing the multimedia ringback tone to the calling party device during ringback while the calling party waits for the call to be answered by the subscriber;
    during ringback and before the subscriber answers the call, receiving a request from the calling party device to download the content indicated in the prompting message of the multimedia ringback tone; and
    during ringback and before the subscriber answers the call, initiating the download of the content to the calling party device responsive to the request.

11. The method of claim 10 wherein the content comprises at least one digital picture.

12. The method of claim 10 wherein the content comprises a video clip.

13. The method of claim 10 further comprising:
    waiting for a time period before attempting to set up the call to the subscriber to allow the calling party more time to decide whether to download the content offered by the subscriber in the prompting message.

14. The method of claim 10 wherein the multimedia ringback tone further includes at least a portion of the content in addition to the message prompting the calling party.

15. The method of claim 10 wherein initiating the download of the content comprises:
    identifying a content server that stores the content;
    identifying a network address for the content server; and transmitting the network address for the content server to the calling party device.

16. The method of claim 10 wherein identifying a multimedia ringback tone for the call comprises:
processing filter criteria defined by the subscriber to identify what to include in the prompting message of the multimedia ringback tone.

17. The method of claim 10 further comprising transmitting another message prompting the calling party for a destination for the content during ringback and before the subscriber answers the call, wherein initiating the download of the content comprises initiating the download of the content to the destination defined by the calling party.

18. The method of claim 17 wherein the destination comprises an email address for the calling party that is specified by the calling party during ringback.

* * * * *